Jan. 13, 1970  G. N. SNIDER, JR  3,489,494
PROJECTOR

Filed July 11, 1967  3 Sheets-Sheet 1

INVENTOR
GIRVAN N. SNIDER JR
BY Theodore Jay Jr
ATTORNEY

Jan. 13, 1970

G. N. SNIDER, JR 3,489,494

PROJECTOR

Filed July 11, 1967

INVENTOR
GIRVAN N. SNIDER JR.
BY Theodore Jay
ATTORNEY

United States Patent Office 3,489,494
Patented Jan. 13, 1970

3,489,494
PROJECTOR
Girvan N. Snider, Jr., 2 Windward Ave.,
White Plains, N.Y. 10605
Filed July 11, 1967, Ser. No. 652,594
Int. Cl. G03b *21/06*
U.S. Cl. 353—67    5 Claims

ABSTRACT OF THE DISCLOSURE

A projector for projecting a magnified image, in two dimensions, of indicia on a horizontal sheet onto the rear of a viewing screen. The projector has a light source, a lens, a first mirror system and a second mirror system. Visible light from the light source is directed upon a horizontal sheet having indicia thereon and a non-magnified image of the indicia is reflected therefrom along a selected path. A lens in the path magnifies the reflected image and inverts it in both directions. The first mirror system, adjacent the lens, receives the magnified inverted image and by repeated reflections the image remains inverted in one direction and is reinverted in the other. The second mirror system is located between the first mirror system and the screen. The second mirror system receives the magnified partially reinverted image and by repeated reflections the image is reinverted in both dimensions and directed upon the screen. The user of the projector can view both the original indicia and the magnified reinverted image simultaneously or sequentially and can point to the original indicia or make notes on a sheet whereby the pointer or notes will appear on the magnified image in the same relative positions on the viewing screen without any inversion or reversal of position.

SUMMARY OF THE INVENTION

In accordance with my invention, visible light is directed upon the indicia bearing sheet whereby a non-magnified image of the indicia is reflected from the sheet along a selected path.

A lens unit is disposed in the path to magnify the reflected image and to simultaneously invert same in both dimensions.

A first mirror system is disposed adjacent the lens unit to receive the magnified inverted image and, thereafter, to produce therefrom by repeated reflections a magnified image which remains inverted in one dimension and is reinverted in the other dimension.

A second mirror system is disposed intermediate the first mirror system and the viewing surface. This second system receives the magnified partially reinverted image, thereafter derives therefrom by repeated reflections a magnified image reinverted in both dimensions, and then directs the magnified fully inverted image upon said viewing surface.

As a result of this arrangement, a user of my apparatus can view both the original indicia and the magnified reinverted image simultaneously or sequentially and can point to the original indicia or make notes on a sheet whereby the pointer or notes will appear on the magnified image in the same relative positions on the viewing screen without any inversion or reversal of position.

Among the numerous applications of my apparatus is that of displaying fingerprints for use by law enforcement officials and others. Two such apparatus can be disposed in a common housing with viewing surfaces in coplanar side by side relation whereby two sets of fingerprints can be magnified and readily compared.

DETAILED DESCRIPTION OF PREFERRED EMBODIMENT

Figure 1:
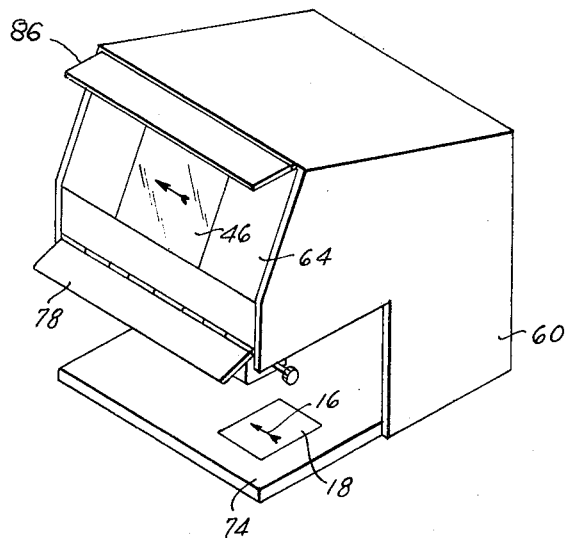
FIG. 1 is a perspective view of one form of my apparatus.
Figure 2:
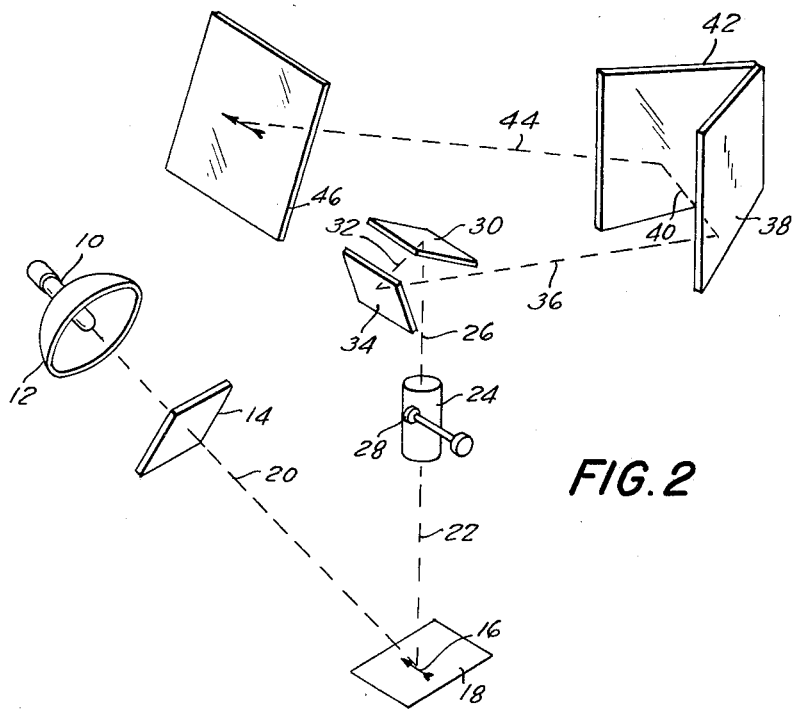
FIG. 2 is a diagrammatical view of the optical system used therein.
Figure 3:
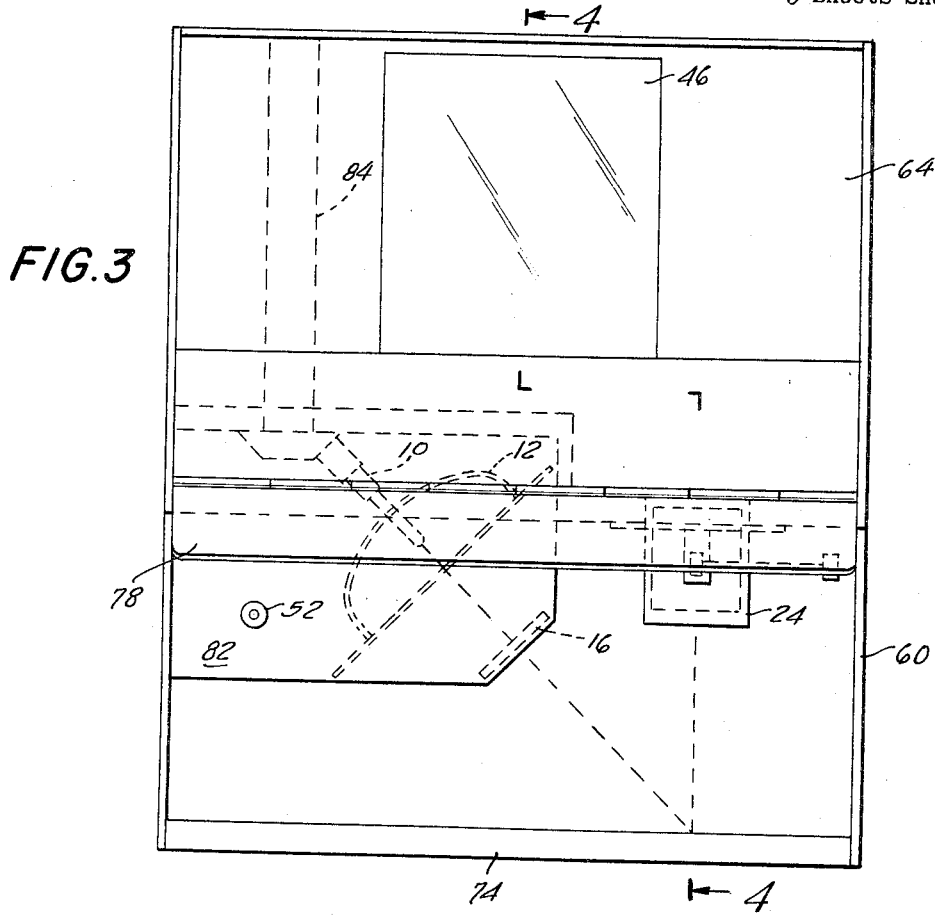
FIG. 3 is a front view of this apparatus.

Referring first to FIG. 2, a high intensity light source such as a tungsten-halogen lamp 10 is disposed in a quasi parabolic reflector 12 directs a ray 20 of a mixture of visible and infrared light inclinedly downward through glass plate 14 upon indicia 16 on a sheet 18. (All rays shown diagrammatically herein actually represent the optical center of the image.) The surface of plate 14 adjacent the lamp is treated with a heat reflecting coating which reflects most of the infrared light back to the lamp and passes most of the visible light onto the sheet whereby the sheet cannot overheat, char or discolor when subjected to prolonged continuous use in the projector.

As a result, a non-magnified image of the indicia is reflected upwards along a vertical path as reflected ray 22. This ray passes through a vertical lens unit 24 wherein the image is magnified and inverted in both dimensions and exits from the unit as ray 26. A manually operable rack and pinion mechanism 28 moves the lenses in the unit up and down as desired for suitable focus control.

Ray 26 strikes the bottom surface of a first plane mirror 30 lying in a plane making an acute angle such as 18 degrees with the horizontal. A first reflected ray 32 leaves mirror 30 and is directed downward to strike the top surface of a second plane mirror 34 disposed adjacent to mirror 30 and also positioned below it. Mirror 34 also makes an acute angle such as 35 degrees with the vertical. Ray 32 is reflected from the top surface of mirror 34 as ray 36 which passes inclinedly upwards below mirror 30 at an angle such as 16 degrees with the horizontal. The magnified indicia image as reflected by mirrors 30 and 34 is reinverted in one dimension but remains inverted in the other.

Ray 36 strikes the front surface of a third vertical plane at an acute angle such as 45 degrees as viewed in a horizontal plane. Ray 36 is reflected therefrom as ray 40. Ray 40 is upwardly inclined at an angle such as 16 degrees with respect to the horizontal. Ray 40 strikes the inclined front surface of a fourth vertical plane mirror 42 at an acute angle such as 45 degrees as viewed in the horizontal plane. Mirrors 42 and 38 define an included angle in the horizontal plane for example of 90 degrees. Ray 40 is reflected from mirror 42 as ray 44 which is directed inclinedly upwards at an acute angle of 16 degrees with the horizontal. The magnified indicia image after being reflected by mirrors 38 and 42 is reinverted in both dimensions. Ray 44 strikes the rear surface of an inclined ground glass viewing screen at an angle essentially perpendicular thereto whereby the magnified indicia as viewed from the front surface of screen 46 is magnified replica of the original indicia on the sheet 18.

Figure 6:
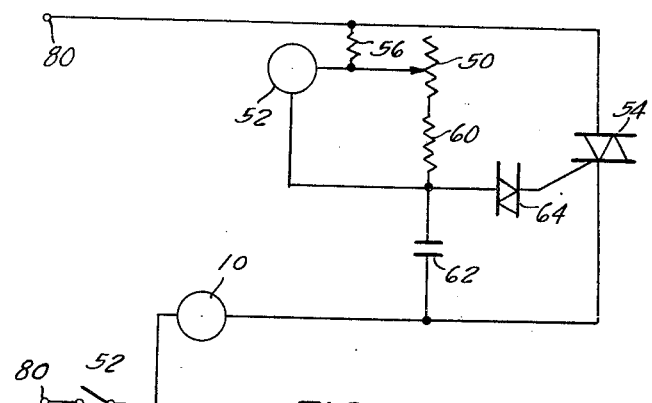
FIG. 6 is a circuit diagram of a light intensity control circuit used in my invention.
Figure 4:
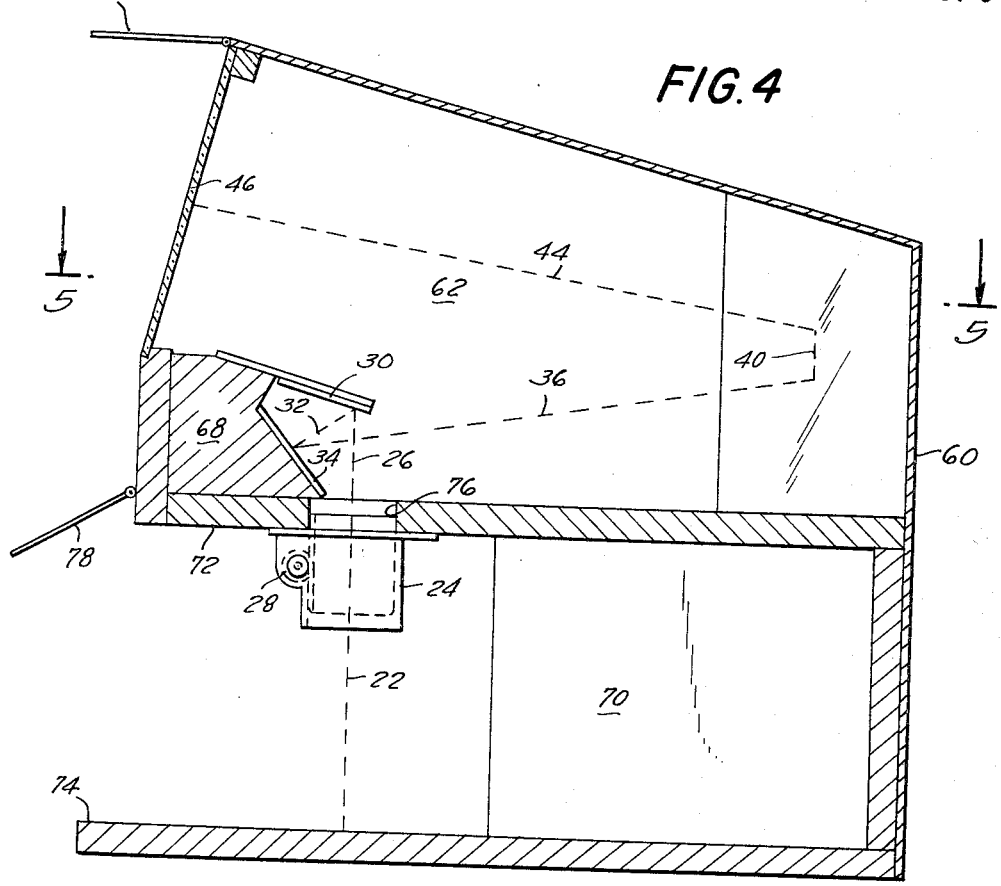
FIG. 4 is a view through 4—4 in FIG. 3.
Figure 5:
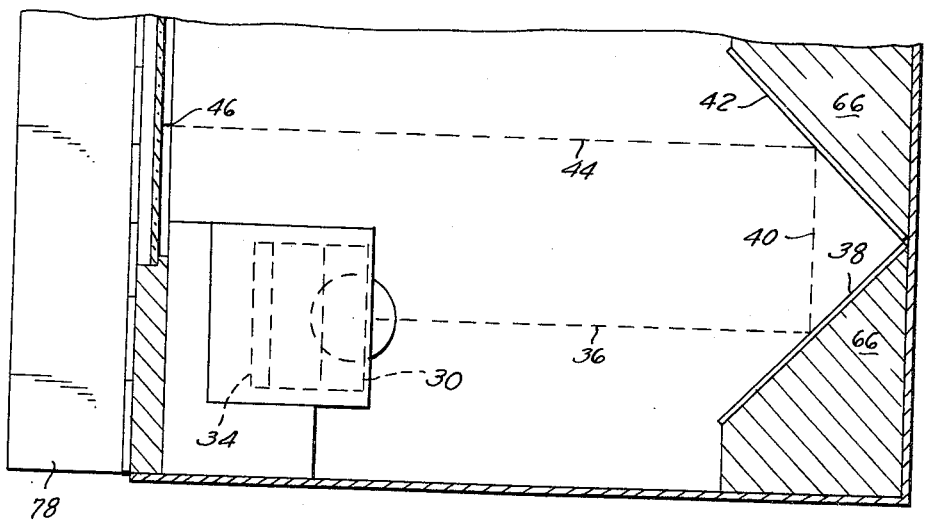
FIG. 5 is a view through 5—5 in FIG. 4.

Referring now to FIG. 6, a circuit is shown for varying the light intensity of the lamp between zero and a preselected value by manual adjustment of rheostat 50. In addition, if button 52 is pressed, the lamp will be at full brilliance which for example can be about twice as great as the preselected value. In the circuit, alternating current, single phase power is impressed across the input terminals 80. One terminal is connected through on-off switch 52 to one side of lamp 10. The other terminal is connected via a triac 54 to the other side of the lamp and also via series connected resistor 56, rheostat 50, resistor 60 and capacitor 62 to the other side of the lamp. The push button 52 is connected between the arm of the rheostat and the junction of capacitor 62 and resistor 60. This junction is also connected via a diac 64 to the gate lead of the triac. (If desired the triac and diac can be replaced by a bi-directional thysistor with integral trigger.) By adjusting the arm of the rheostat, more or less resistance is inserted in the circuit, thus varying the on time of the diac-triac (i.e., the period of current conduction) between zero and approximately one-half cycle, and controls brilliance accordingly. When button 52 is depressed, resistor 56 and rheostat 50 are shorted out, the dia-triac conducts for essentially the entire cycle, and the lamp is at full brilliance. Resistor 56 remains in the circuit to limit current flow through the gate.

Referring now to FIGS. 1, 3, 4 and 5, a housing 60 is provided with a hollow upper compartment 62 having an inclined front panel 64 with a central opening in which the viewing screen 46 is disposed. The third and fourth mirrors 38 and 42 are secured to vertical supports or frames 66 having the requisite supporting surfaces which maintain the relative mirror positions and are secured to the rear inner wall of the upper compartment. A horizontal support 68 extends rearward from the panel 64 in the compartment with an opening in which the first and second mirrors 30 and 34 are held.

The housing has a lower compartment 70 which is open and has flat horizontal top and bottom walls 72 and 74. Wall 72 is shared in common with the upper compartment and has an aperture 76 through which the light can pass. The lens unit 24 is disposed in alignment with the aperture 76 through which the light can pass. The lens unit 24 is disposed in alignment with the aperture and extends downward from wall 72. The top surface of wall 74 (which is colored white) serves to receive the indicia bearing sheet 18. This white color reflects heat and also facilitates use of transparent or translucent sheets as well as opaque sheets.

Wall 72 has a front mounted chamber 82 into which the lamp and reflector are mounted together with the circuit elements. Chamber 82 has an opening in which the plate 14 is disposed.

A light shade 78 is pivotally secured to the bottom edge of the front panel. A second such shade 86 can be pivotally secured to the top edge of the front panel. Shade 86 serves to shield the screen 48 from ambient light and shade 78 serves to shield the observers' eyes (at will) from light reflected directly from the sheet.

All requisite interior surfaces are coated black to prevent undesired light reflection and to enhance brightness and sensitivity. A chimney system 84 can be incorporated with the housing and chamber for enhanced cooling during use.

If desired, housing 60 can be enlarged to accommodate an additional projection system, the two viewing screens being disposed side by side whereby indicia on two sheets 18 disposed adjacent each other on wall 74 can be magnified reinverted and compared as previously described.

While I have described my invention with particular reference to the drawings, my protection is to be limited only by the terms of the claims which follow.

What is claimed is:

1. Apparatus for projecting a magnified image, in two dimensions, of indicia on an essentially horizontal sheet onto the rear of a viewing screen, the image to be viewed from the front of the screen, said apparatus comprising:

means to direct visible light upon said sheet whereby a non-magnified image of said indicia is reflected therefrom along a selected path;

a lens unit disposed in said path to magnify said reflected image and to simultaneously invert same in both dimensions;

a first mirror system disposed above and adjacent said lens unit to receive said magnified inverted image and to produce therefrom by repeated reflections a magnified image which remains inverted in one dimension and is reinverted in the other, said first system consisting of first and second plane mirrors, the first mirror being disposed above the unit with a bottom reflecting surface lying in a plane intersecting the horizontal at a first acute angle, the second mirror being disposed intermediate the first mirror and the unit with a top reflecting surface lying in a plane intersecting the vertical at a second acute angle, the image yielded by the unit first striking the bottom reflecting surface of the first mirror, the image secondly being downwardly reflected upon said top reflecting surface of the second mirror and thereafter being reflected inclinedly upwards; and a second mirror system disposed intermediate the first mirror system and said screen, second mirror system receiving said magnified partially reinverted image which is reflected inclinedly upwards from the first system, and producing therefrom by repeated reflections a magnified image reinverted in both dimensions, and directing said magnified fully reinverted image upon said screen, said second system consisting of third and fourth plane mirrors which each have one reflecting surface and which are disposed in vertical planes which intersect, the third and fourth mirrors having a common vertical edge, the image reflected upon the second system first striking the one surface of the third mirror, then being reflected inclinedly upwards upon the said one surface of the fourth mirror and finally being directed inclinedly upwards to impinge upon said screen.

2. As set forth in claim 1 wherein said means includes a high intensity light source disposed in a quasi-parabolic reflector, the light from said source and reflector being directed inclinedly downwards upon said sheet.

3. Apparatus as set forth in claim 2 wherein said means includes a plate of heat resistant glass disposed between said source and said sheet, said glass being treated to reflect a major portion of infrared light emitted from the source backwardly thereto and to transmit a major portion of visible light emitted from the source onto said sheet.

4. Apparatus as set forth in claim 3 further including manually controlled means to move the lenses in the unit up and down in a vertical direction for focus adjustment.

5. Apparatus a s set forth in claim 4 further including means to vary the intensity of the light emitted from said source.

References Cited

UNITED STATES PATENTS

| 2,238,267 | 4/1941 | Katz | 353—64 XR |
| 2,552,280 | 5/1951 | Hudak | 353—64 |
| 2,711,669 | 6/1955 | Erban | 353—67 |
| 2,742,815 | 4/1956 | Dietrich et al. | 353—66 |
| 2,847,901 | 8/1958 | Sassaman et al. | 353—77 XR |
| 3,225,648 | 12/1965 | Toler | 353—64 |

NORTON ANSHER, Primary Examiner
ROBERT P. GREINER, Assistant Examiner

U.S. Cl. X.R.

353—78